US005508936A

United States Patent [19]

King et al.

[11] Patent Number: 5,508,936

[45] Date of Patent: Apr. 16, 1996

[54] GARMENT MARKER SYSTEM AND METHOD HAVING COMPUTER ASSISTED ALIGNMENT WITH SYMMETRIC CLOTH PATTERNS

[75] Inventors: Thomas King, Norwich, Conn.; Craig L. Chaiken, Spring, Tex.

[73] Assignee: Gerber Garment Technology, Inc., Tolland, Conn.

[21] Appl. No.: 290,016

[22] Filed: Aug. 12, 1994

[51] Int. Cl.[6] .................... G06F 19/00

[52] U.S. Cl. .................... 364/470; 364/474.13; 382/111; 382/296

[58] Field of Search .................... 364/470, 468, 364/474.09, 469, 474.13; 382/8, 10, 45, 46, 48, 111, 296; 348/86, 88, 94, 95

[56] References Cited

U.S. PATENT DOCUMENTS

| | | | |
|---|---|---|---|
| 4,853,866 | 8/1989 | Galan et al. | 364/470 |
| 4,905,159 | 2/1990 | Loriot | 364/470 |
| 5,204,913 | 4/1993 | Morooka et al. | 364/470 X |
| 5,353,355 | 10/1994 | Takagi et al. | 364/470 X |

FOREIGN PATENT DOCUMENTS 2038925 8/1993 Spain .

OTHER PUBLICATIONS

Translation of Patent 2038925—Spain (Aug. 1, 1993).

*Primary Examiner*—Joseph Ruggiero
*Attorney, Agent, or Firm*—McCormick, Paulding & Huber

[57] ABSTRACT

A method and apparatus for adjusting a marker in preparation for cutting that is adapted for use with fabrics having a stripe or plaid patterns that provide for an axis of symmetry. The present invention is characterized by computer assisted design matching that provides for either manual or automatic alignment of the garment segments in the computerized marker with reference and match locations on the fabric web.

8 Claims, 7 Drawing Sheets

GARMENT MARKER SYSTEM AND METHOD HAVING COMPUTER ASSISTED ALIGNMENT WITH SYMMETRIC CLOTH PATTERNS

TECHNICAL FIELD

The present invention relates to garment marker systems in general and more particularly towards garment marking systems that have computer assisted marker alignment of symmetric fabric patterns or designs, such as stripes, plaids or engineered prints.

CROSS REFERENCE TO RELATED APPLICATIONS

Some of the subject matter herein is disclosed and claimed in the following U.S. patent and pending U.S. patent applications, all of which are incorporated herein by reference.

U.S. Pat. No. 3,495,492 entitled "Apparatus for Working on Sheet Material";

U.S. Pat. No. 3,548,697 entitled "Apparatus for Cutting Sheet Material";

U.S. Pat. No. 5,333,111 entitled "A Garment Cutting System Having Computer Assisted Pattern Alignment".

U.S. Pat. No. 5,020,405, now U.S. Pat. No. 5.020,405, entitled "Apparatus With Moveable Pin For Spreading And Cutting Layups Of Sheet Material".

U.S. patent application Ser. No. 08/210,303, entitled "A Garment Marker System Having Computer Assisted Alignment Of Variable Contrast Cloth Designs.

BACKGROUND OF THE INVENTION

Computerized garment marker generation and cutting systems are well known in the art. A marker generally is the spatial array of garment segments positioned in a cutting sequence. Known systems include those offered by the assignee of the present invention, such as Gerber Garment Technology (GGT) models S-91, S-93 and S-95. In general, these known systems utilize a marker generated with a computer to optimize piece pattern density and thereby minimize the waste of fabric. However, fabrics which have a plaid or stripe are troublesome in that the clothing designer can specify an alignment of the pattern in several adjacent pieces. Consequently, the highest density of garment segment or piece patterns in the marker when placed over the fabric is not necessarily the one which provides proper pattern alignment.

In the past, the computerized marker systems simply generated a marker having fairly large tolerances between adjacent patterns. The cloth to be cut was provided to a skilled worker who would manually align the several patterns with the geometric fabric design in the cloth and thereafter cut the cloth. As a result, garments made from cloth with geometric designs, such as stripes or plaids, invariably mandate higher garment costs due to the increased waste and the use of slow, skilled labor in the cutting process.

A known garment cutting system adapted for use with fabrics having a stripe or plaid design is disclosed and claimed in the aforementioned U.S. Pat. No. 5,333,111. The '111 system is characterized by computer assisted design matching that allows for either manual or automatic matching both between a garment marker to the fabric layup and between sequenced garment segment patterns. The '111 system employs data reduction techniques to reduce processing time and includes apparatus for optimizing image stability, focus and illumination.

Another known system that adjusts the marker prior to the cloth cutting step and that is also adapted for use with fabrics having a stripe or plaid design is characterized by computer assisted design matching that automatically aligns the fabric web with the cutting apparatus and matches fabrics whose designs vary in contrast. There is also coordinate matching between an image obtained by the system's camera and the actual fabric.

In a garment or upholstery cutting application, it is sometimes necessary to align a point on one garment segment (a reference point) with a similar point on one or more other garment segments (a match point). With certain "symmetric" repeat fabrics, it is possible to achieve better fabric utilization by allowing the reference and match garment segments to differ in orientation than as programmed in the marker. Generally, the fabric repeat at a reference and match point are in the same orientation. Alignment, therefore, may be achieved by simply sliding one of the images up, down, right or left.

It would be advantageous to have a system which would provide, quickly and at a lower cost, computer assisted geometric fabric design alignment between the marker patterns and fabric with symmetric patterns so that computer controlled cutting knives can be used. The present invention is drawn toward such a system.

SUMMARY OF INVENTION

Figure 1:
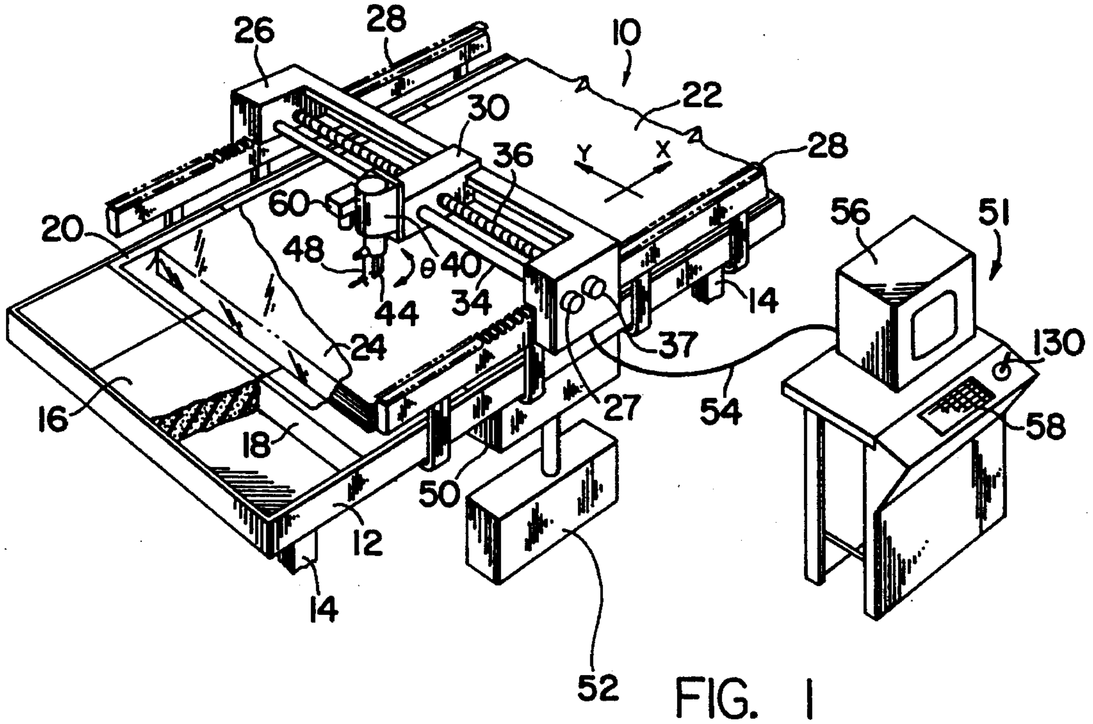
FIG. 1 is a simplified schematic illustration of a system as provided by the present invention.

An object of the present invention is to provide a method for use in aligning garment segments in a marker with fabric patterns having an axis of symmetry formed by stripes, plaids and the like.

According to the present invention, a method for aligning a dependent garment segment in a marker with a match location in a pattern in a fabric web on an upper surface of a table in a system having a moveable video sub-system including a camera having an array of pixel elements configured to receive light from a portion of the fabric web and provide electrical signal equivalents thereof includes the steps of: receiving marker signals including signals indicative of a first garment segment having a reference location therein and a second garment segment having a match location therein; receiving, from the camera video sub-system, signals corresponding to the fabric web pattern; comparing the fabric web pattern signals with the marker signals and generating signals indicative of initial fabric web pattern position as compared to the first garment segment reference location. The method also includes the steps of generating a reference image of camera video sub-system pixels about the first garment segment reference position and determining an axis of symmetry substantially parallel to the fabric web pattern. Also, the reference image is divided into a plurality of N pixel arrays parallel in orientation to the axis of symmetry. A match image is created from the reference image pixel arrays by positioning, across the symmetry axis, a copy of each m pixel array at a corresponding N–(m+1) array position. The method includes the steps of comparing camera video sub-system pixels corresponding to an image about the second garment segment match position with the match image signals; generating signals to determine a match position of the match image relative to the said second garment segment reference point image that removes any difference in pixel state therebetween and generating signals to adjust the second garment segment position in the marker to remove a difference between the location of the second garment segment reference point in the marker and the match position.

According to another aspect of the present invention, the method of the foregoing also includes the steps of selecting a first axis of symmetry to extend in a direction parallel to the length of said web; selecting a second axis of symmetry to extend in a direction perpendicular to the length of the web; dividing the reference image into a first plurality of N pixel arrays parallel in orientation to the first axis of symmetry and creating a first match image from the reference image pixel arrays by positioning, across the first symmetry axis, a copy of each m pixel array at a corresponding N–(m+l) array position. Thereafter, the method provides for the steps of dividing the first match image into a second plurality of N pixel arrays parallel in orientation to the second axis of symmetry; creating a second match image from the first match image pixel arrays by positioning, across the second symmetry axis, a copy of each m pixel array at a corresponding N–(m–1) array position. Further, the method includes the steps of comparing camera video sub-system pixels corresponding to an image about the second garment segment match position with the second match image signals; generating signals to determine a match position of the second match image relative to the second garment segment reference point image that removes any difference in pixel state therebetween; and generating signals to adjust the second garment segment position in the marker to remove a difference between the location of the second garment segment reference point in the marker and the match position.

DESCRIPTION OF THE PREFERRED EMBODIMENT

In the following description, an illustrative embodiment of the present invention is described in connection with the use of apparatus shown and described in U.S. Pat. No. 3,495,492 entitled "Apparatus for Working on Sheet Material" and U.S. Pat. No. 3,548,697 entitled "Apparatus for Cutting Sheet Material", which are assigned to the assignee of the present invention and incorporated herein by reference. It will be appreciated that the invention is not limited solely to the use of such apparatus.

Figure 6:
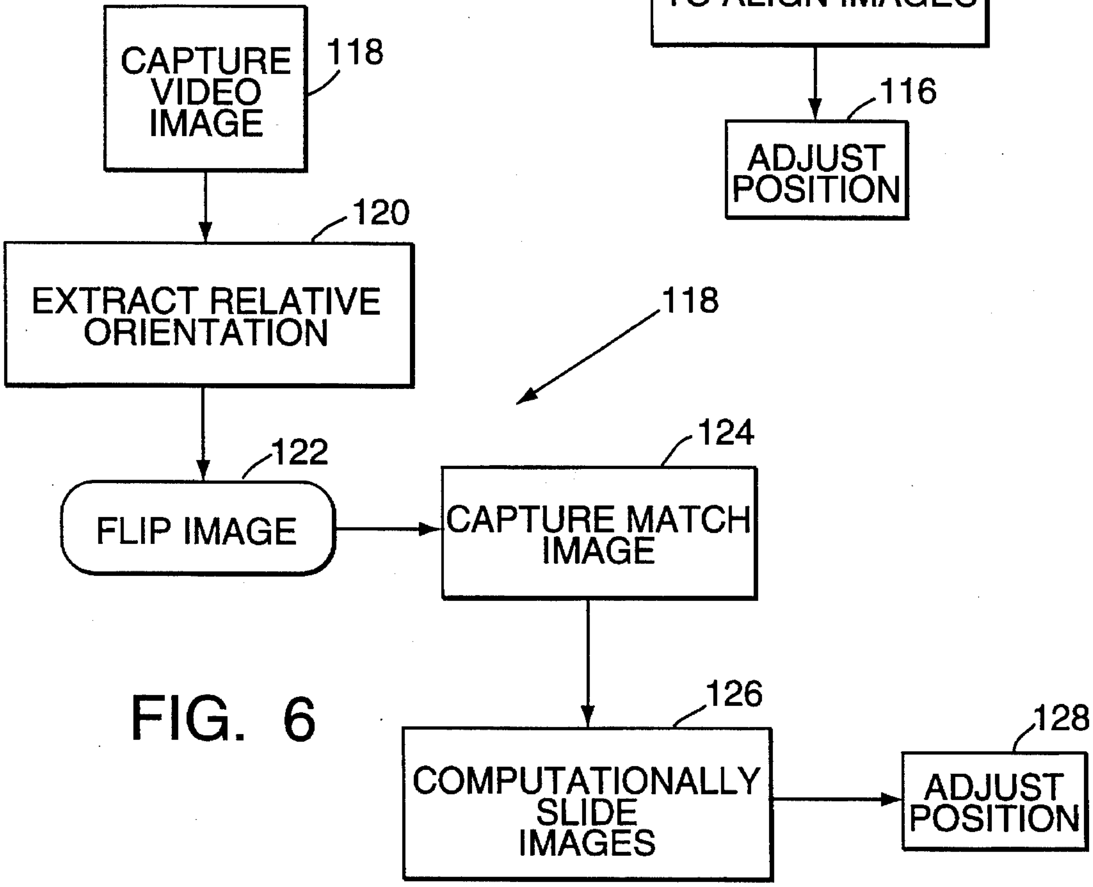
FIG. 6 is a diagrammatic illustration of an algorithm executed by the system of FIG. 1 in automatically adjusting a marker to perform a symmetric pattern match.
Figure 7:
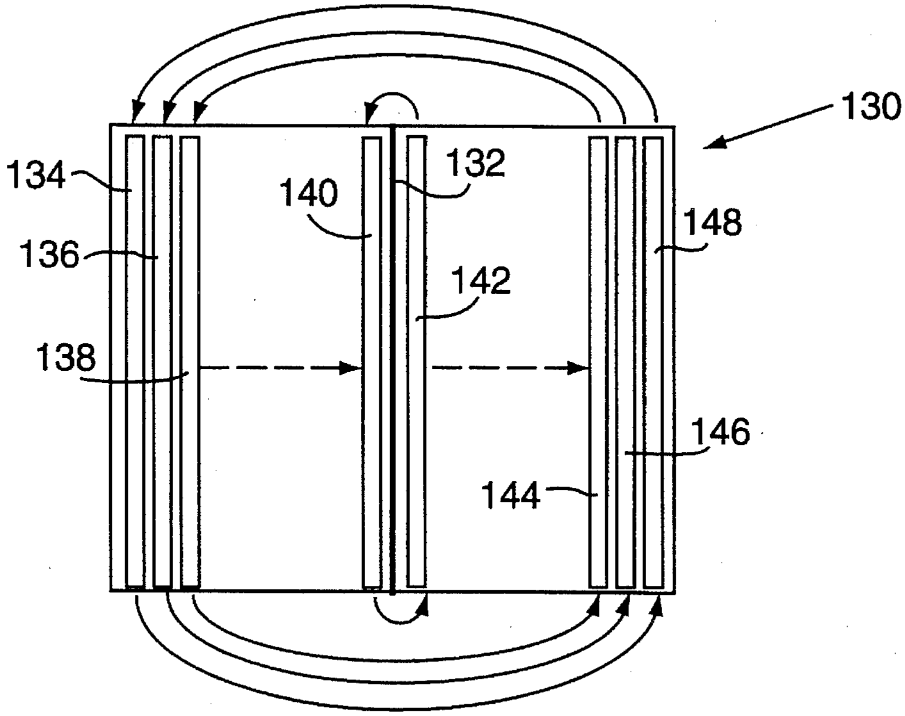
FIG. 7 is a simplified schematic illustration of arrays of camera pixels showing computational switching of a match image for the symmetric match as shown in FIG. 2.

Referring now to FIG. 1, a sheet material or fabric cutting system, which is referred to generally with the reference character 10, is shown having a table 12 supported on legs 14 therefor. The table 12 is in the form of a container-like frame which carries a plurality of plastic blocks 16, having bristles arranged to form a penetrable bed 18 having a flat upper surface 20 thereon. The substantially continuous planar surface 20 formed by the upper surfaces of the blocks 16 supports a layup or spread 22 of a single or plurality of plys sheet materials, such as fabric, which are arranged in vertically stacked relation and in position on the surface 20 to be cut. As seen in FIGS. 6 and 7, the sheet fabric has a periodic geometric fabric design 21 woven therein. The layup of sheet material 22 may be covered by a sheet of thin plastic film 24, e.g. polyethylene which serves to contain a vacuum which is applied to the layup 22.

A main carriage 26, which transversely spans the table 12, is supported on the table by a pair of elongated racks 28 mounted on opposite sides of the table 12 and extending longitudinally thereof for moving the carriage 26 in a longitudinal or X direction. The main carriage 26 includes a drive shaft (not shown) which also extends transversely of the table and has pinions mounted at opposite ends for engagement with the racks 28 to move the carriage 26 longitudinally across the table in response to the operation of a drive motor 27 drivingly connected to the shaft. The main carriage 26, movably carries thereon a cutter carriage 30 mounted for movement in the Y direction on a guide bar or tube 34 and a lead screw 36, which also extends transversely of the table 12 and serves to support and drive the cutter carriage 30 transversely across the table, or in the Y direction, in response to the operation of another drive motor 37 drivingly connected with the lead screw 36.

The cutter carriage 30 has a cutter head 40 mounted thereon for vertical movement relative thereto so as to be capable of being raised and lowered to elevate a reciprocating cutting blade 44 and an associated presser plate mounted thereon from a normal cutting position to a position at which they are located entirely not of contact with and above the fabric layup 22. Thus, when the cutter head 40 is raised, the lower extremity of the blade 42 is positioned above the layup 22 so that the head with the blade may, if desired, be moved to any preselected position above the layup, and then lowered to pierce the layup, thus allowing a cut to be started on any desired position in the fabric. The blade 42 is reciprocated vertically by a motor (not shown) in the cutter head 40, and is also rotated about its own vertical axis, referred to as the (theta) axis, as indicated in FIG. 1, by another motor (not shown) in the cutter head 40. Those skilled in the art will note that other cutting apparatus such as lasers or water may be substituted for the blade.

The cutter head 40 also caries a locator or pointer 48. The pointer is pivotally mounted on a pin projecting from the head so that the pointer may be pivoted into the illustrated operative position in front of the cutter blade for precisely positioning the cutter head 40 and blade relative to a desired location or index mark on the layup 22, and is then swung upward and out of the way to a stowage position after the positioning of the cutter head 40 is performed. Forms of pointers other than that shown in FIG. 1, such as a laser may be utilized to perform the function of accurately positioning the cutter blade 42 over a specific point on the layup 22.

The table 12 is provided with ducts 50 which are connected to a vacuum pump 52. The plastic overlay or film 24 on the spread or layup 22 serves to contain the vacuum applied through the table surface or bed 18 of porous or vertically vented plastic blocks 16, causing the sheet material or fabric in the layup 22 to be compressed into a firm stack that will not shift during cutting. The drawing, for ease of illustration, only shows one table segment and a diagrammatic showing of the vacuum system; but it will be understood that each table segment has a separate vacuum valve which is actuated by the carriage 26 when it is over a particular segment. Vacuum is applied, therefore, only to the area under the carriage to hold the fabric being cut. This allows the cut bundles to be easily removed, and makes the application of the vacuum from a single source practical.

If it is desired to cut more than one layer of fabric having designs thereon, it may also be desirable to provide the cutting table with a system of pins to facilitate spreading fabric with the design of each layer corresponding to the adjacent layer. Such a system is described in U.S. Pat. No. 5,020,405, entitled "Apparatus With Moveable Pins For Spreading And Cutting Layups Of Sheet Material". Alternately, the fabric can be spread with the designs on the various layers corresponding before the fabric layup is placed on the table.

Those skilled in the art will note that for applications where alignment takes place on the cutting table, the plastic layer is not in place nor is vacuum applied during the alignment process. Similarly, for those off-cutter applications no plastic is employed nor is there a vacuum or bristle bed. Rather, the system includes a beam, camera head, controller and drive rack similar to the above componentry.

The cutting system 10 includes a controller 51 which sends and receives signals on lines 54 and processes those signals in accordance with algorithms detailed hereinafter. The controller comprises a video display 56 of a known type as well as a conventional keyboard 58. The controller includes a PC type computer with sufficient computer memory and other peripheral hardware to perform the functions set forth herein. The controller may also include a "video frame grabber"/image processing circuitry such as the Targa Plus board marketed by the TrueVision company.

As is known, a marker is comprised of a plurality of adjacent garment segments or panels configured as close as possible to minimize the waste of fabric. The present system is adapted to use a computer generated data file resident in the controller as a marker. Great care must be exercised with a plaid or other fabric having a repeating design to position the pattern so that the garment segments will have the desired alignment when sewn together. Consequently, the marker includes not only information regarding the perimeter of the garment segments but also contains data on the fabric design and the desired relationship of the particular garment segments. This correlating information is in the form of matching and reference points typically located in the interior of the patterns where a particular point in the fabric design is supposed to lie.

The result of the garment fabrication parameters such as imprecise dimensional differences in the design repeat as well as the effects of bowing and skewing caused by poor control during the fabric finishing operations forces the marker maker to leave relatively large buffers around the garment segments that require matching; often as much as half a fabric design repeat. In the present context, "matching" is defined as the alignment of fabric design repeats in the fabric from one segment of a garment to a corresponding segment, i.e. the top sleeve of a man's coat matching the front part thereof at a specified point. The amount of buffer or extra fabric allowance required to bring a garment segment into alignment with its neighbor is a factor derived from the repeat of the fabric pattern and the quality level of the fabric in use.

Enough buffer must be left to allow the system or operator to move the garment segment to a different position than the marker maker on the CAD system originally chose. An automated system must compute the amount of offset needed to properly align the marker with the actual fabric pattern. Moreover, it is sometimes necessary to align the marker or a portion(s) with the web of the fabric because the web has been fed onto the cutting table at a slight angle or because of inaccuracies in the fabric. The present system has the capability of accomplishing these objectives, as detailed herein.

Figure 2:
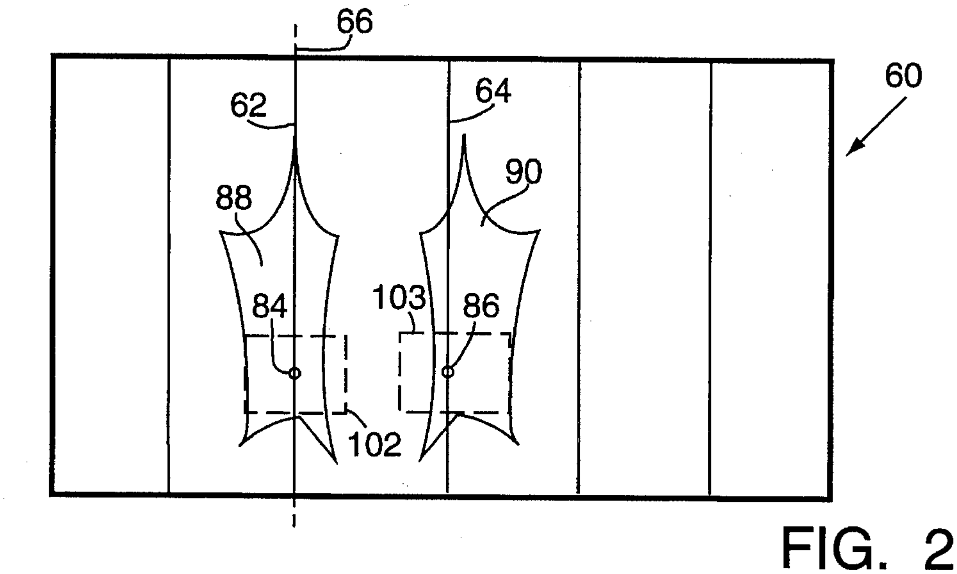
FIG. 2 is a simplified schematic illustration of a web with which a single axis symmetric match is performed by the system of FIG. 1

Referring now to FIG. 2, there is shown a simplified schematic illustration of a portion of a web 60 characterized by repeated stripes 62, 64 across the fabric. These stripes can be considered to form axes of fabric symmetry, such as axis 66. Similarly, the fabric pattern of web 68 displayed in FIG. 3 contains horizontal axes of symmetry 70, 72 formed by stripes 74, 76 which repeat across the web. In FIG. 4, two axes of symmetry 78, 80 are defined by the fabric pattern in web 82 and can be utilized as detailed below.

Figure 3:
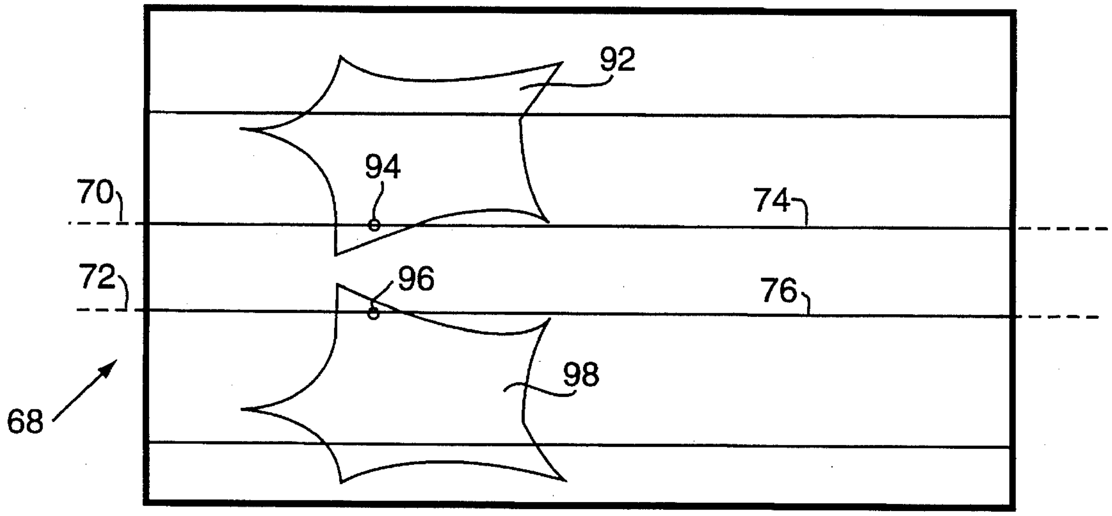
FIG. 3 is a simplified schematic illustration of a web with which a symmetric match is performed by the system of FIG. 1 along a second axis orthogonal to the axis utilized in FIG. 2.
Figure 4:
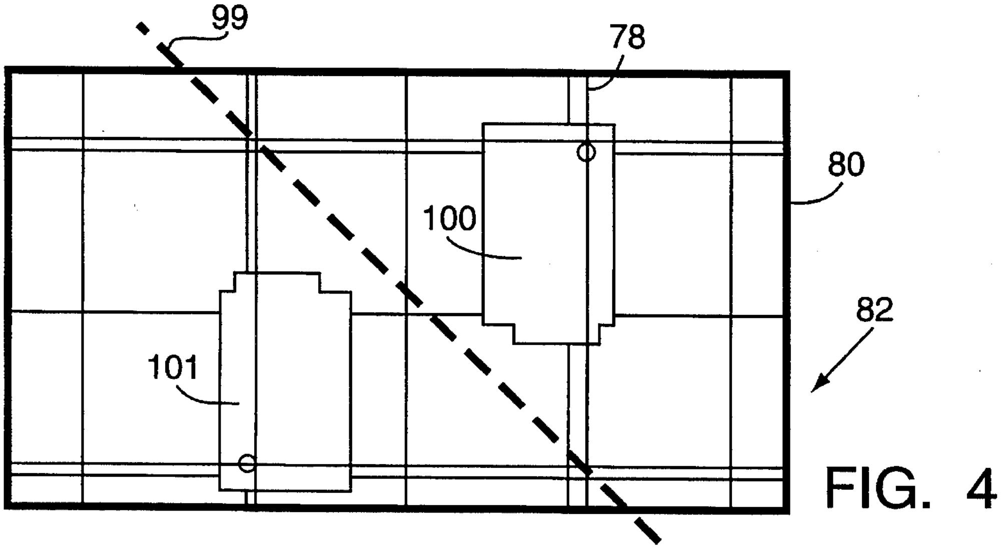
FIG. 4 is a simplified schematic illustration of a web with which a two axis symmetric match is performed by the system of FIG. 1.

For fabrics having symmetric patterns of the type shown in FIGS. 2–4, it has been determined that, prior to cutting, the marker may be adjusted in a relatively simple manner as compared as to other types of fabric whose patterns lack this basic geometric symmetry. The present invention generates signals to move garment segments with a minimum of computation through the use of "mirror" images that are slid about a match point on the fabric.

Reference point 84 and match point 86 are located about the vertical axes of symmetry which pass respectively through anchor garment segment 88 and another garment segment 90 whose location is dependent on the location of the anchor garment segment. Each garment segment has a reference/match point in it which is to be aligned relative to the corresponding pattern repeat in the fabric. In FIGS. 2–4, reference and match points for both the marker and fabric are shown already aligned.

In FIG. 3, garment segment 92 constitutes the anchor segment having a reference point 94 located in relation to a corresponding repeat position on the web. A fabric pattern to garment segment match point 96 is located on the adjacent garment segment 98 in the marker and must be positioned in a corresponding match position on the fabric. For those situations which utilize two orthogonal axes of symmetry, such as the fabric pattern shown in FIG. 4, there is a resultant or virtual axis of symmetry 99 positioned at a 45 degree angle to garment segments 100, 101 in the marker.

As with other computerized marker systems, a match-to-fabric operation can be performed after initializing the system with the web in which the anchor, or primary, garment segment contained in the marker is positioned with respect to the fabric. This process is the same as is set forth in the above referenced U.S. Patent and Patent Applications. The position of the secondary or dependent garment segment in FIG. 2 is adjusted relative to the anchor segment after this initialization process. Thereafter, the other garment segments in the marker have their positions adjusted by the controller to account for stretch, misalignment, etc. of the actual fabric on the cutting table.

Referring again to FIG. 2, the symmetric match operation as performed by the present invention can be accomplished manually or automatically. Regardless, a reference image 102 is obtained about the reference point. Thereafter, a subsequent match image 103 is computationally determined as detailed herein and is positioned in the proximity of the dependent garment segment match position. The computed image is moved about the initial match position. In the manual operation, the operator determines that position of the match image which removes any variation between the computed and background images. At the match image position, the computed and live background images merge seamlessly into one another. The difference in location of this match image position as compared to that contained in the marker is the amount by which the marker is adjusted. In an automatic mode this difference is determined computationally.

Figure 5:
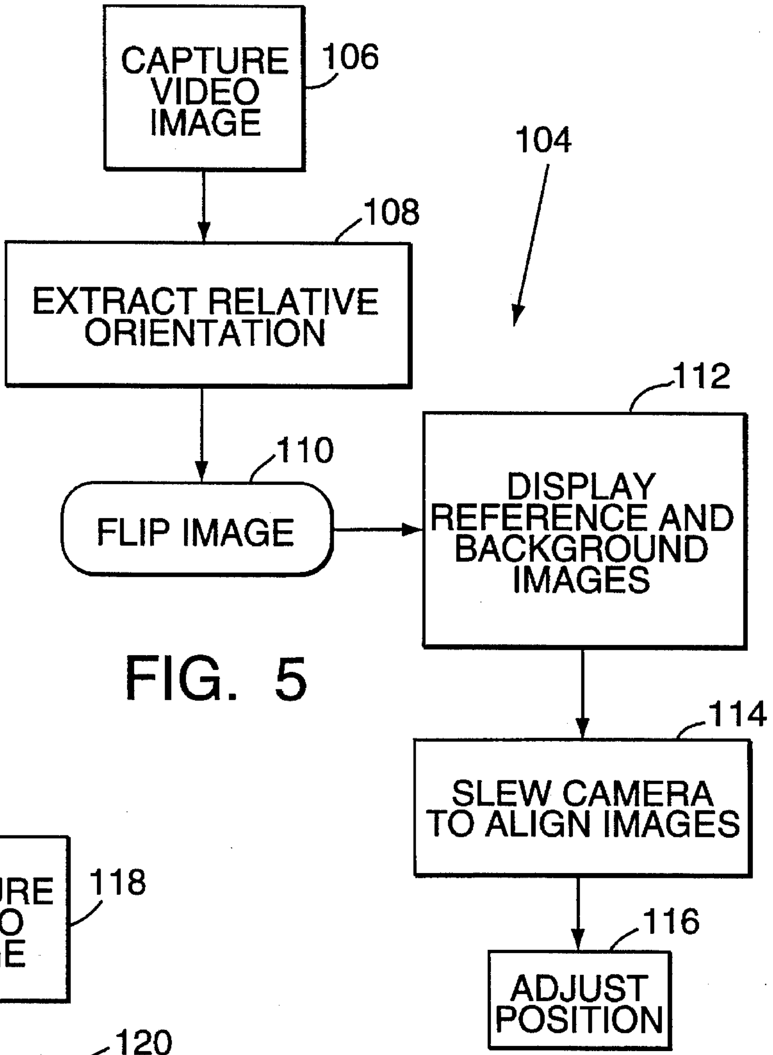
FIG. 5 is a diagrammatic illustration of an algorithm executed by the system of FIG. 1 in manually adjusting a marker to perform a symmetric pattern match.

FIG. 5 is a simplified diagrammatic illustration 104 of the manual process used to generate a symmetric match as provided according to the present invention. At block 106, a video image is captured corresponding to the reference image noted above. The relative orientation between the reference point and the corresponding match point in the marker is extracted from a cut file (block 108). Those skilled in the art will note that this file contains the information relating to the marker and web pattern parameters indicating, for example, which axis of symmetry is to be utilized in performing the symmetric match. At block 110, the reference image is computationally "flipped" based on the information obtained from the cut file. As detailed herein, the controller computes a mirror image of the reference image made by replacing pixels at a given location in an image with pixels from an equivalent location across the axis of symmetry, essentially flipping the image about the symmetry axis.

The flipped reference image is displayed in a static foreground target image over a live background image (block 112). Thereafter, the camera is manually slewed by an operator so that the fabric repeat in the background image is aligned with a fabric image in foreground image (block 114). As noted above, this will then remove any discrepancies between the two images so that they tend to blend together. The position of this image is recorded by the system and the position of the subsequent garment pattern is adjusted to reflect the corrected position (block 116).

FIG. 6 is a simplified diagrammatic illustration 118 of an algorithm performed by the present system in executing a symmetric match automatically. At block 119, a video image of a reference position is captured. Thereafter, the relative orientation between the reference and match points is extracted from a cut file (block 120). The reference image is computationally flipped based on these parameters, as above (block 122). A match image is captured (block 124). The flipped reference image is thereafter computationally slid up, down, right and left over the match image such that the fabric repeat and the reference and match images are aligned (block 126). The computationally movement of the images is accomplished in substantially the same manner as described in the U.S. patent applications referenced above. The criteria for the match is the same and is electrically equivalent to that set forth above with respect to the manual method in FIG. 5. That is, the images are moved such that any discrepancy between the pixels in the live background image and the flipped image is eliminated. This position is noted and the marker position of the subsequent garment segment is adjusted (block 128).

Figure 8:
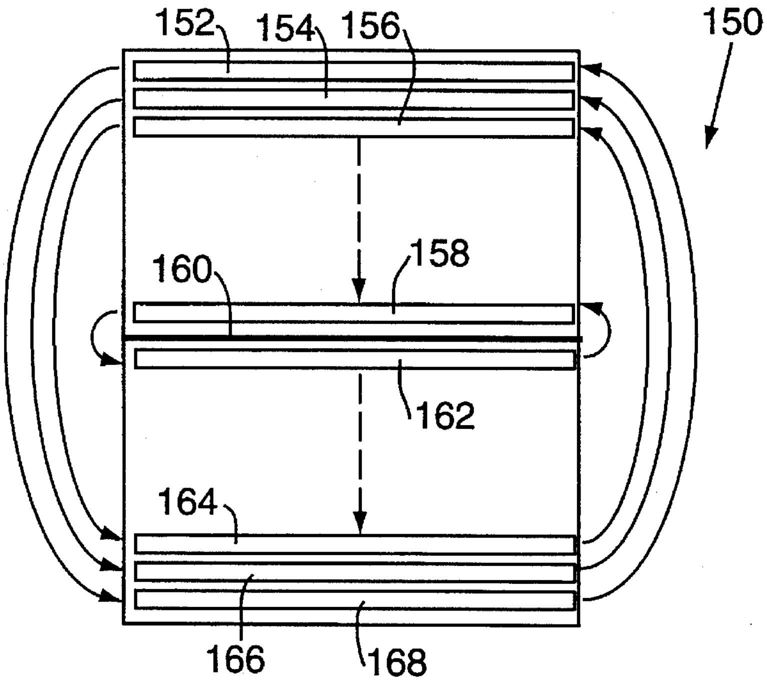
FIG. 8 is a simplified schematic illustration of arrays of camera pixels showing computational switching of a match image for the symmetric match as shown in FIG. 3.

FIGS. 7 and 8 schematically illustrate the process by which the present invention accomplishes the computational "flipping" which results in the creation of a mirror image used over the match point in the subsequent garment segment. The process represented in FIG. 7 can be referred to as an X symmetric match, while that shown in FIG. 8 is an example of a Y symmetric match. In FIG. 7, there is shown a diagrammatical illustration of the process that is accomplished in the type of symmetric match generated which respect to FIG. 2. The pixels which comprise captured image 130 are divided into a series of arrays about a center axis of symmetry 132. Arrays 134 through 140 are configured on the left hand side of the axis of symmetry while arrays 142 through 148 are configured on the right hand side. The pixel flipping process actually constitutes a substitution of the arrays from one position in the image to another position symmetric about the axis of symmetry. For example, left most array 134 is moved to the position of rightmost array 148. Accordingly, arrays which are adjacent the axis of symmetry are simply interchanged.

Figure 9:
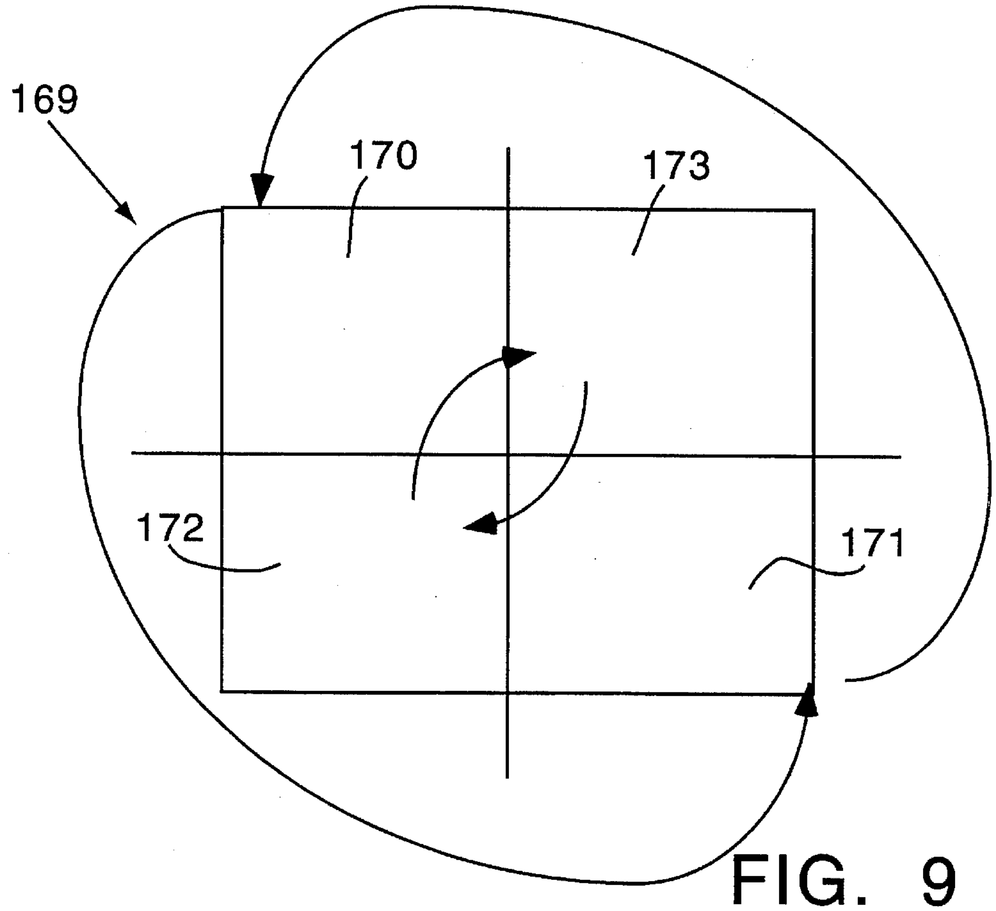
FIG. 9 is a simplified schematic illustration of arrays of camera pixels showing computational switching of a match image for the symmetric match as shown in FIG. 4.

A similar process occurs with respect to the computational match performed with respect to FIG. 3. The image 150 of FIG. 8 contains pixels which are divided into an upper series of arrays 152–158 about a horizontal axis of symmetry 160 and a corresponding lower series of arrays 162–168. Array 152 is substituted for array 168, while arrays 158 and 162 which lie on opposite sides of the axis of symmetry are simply interchanged. FIG. 9 shows a schematic illustration of an image 170 in which two axes of symmetry are used to generate the flipped image. In this case, the pixels from upper left quadrant 172 are moved to a corresponding position in the lower right quadrant, while pixels in the lower left quadrant are moved to the equivalent position in the upper right quadrant.

Figure 10:
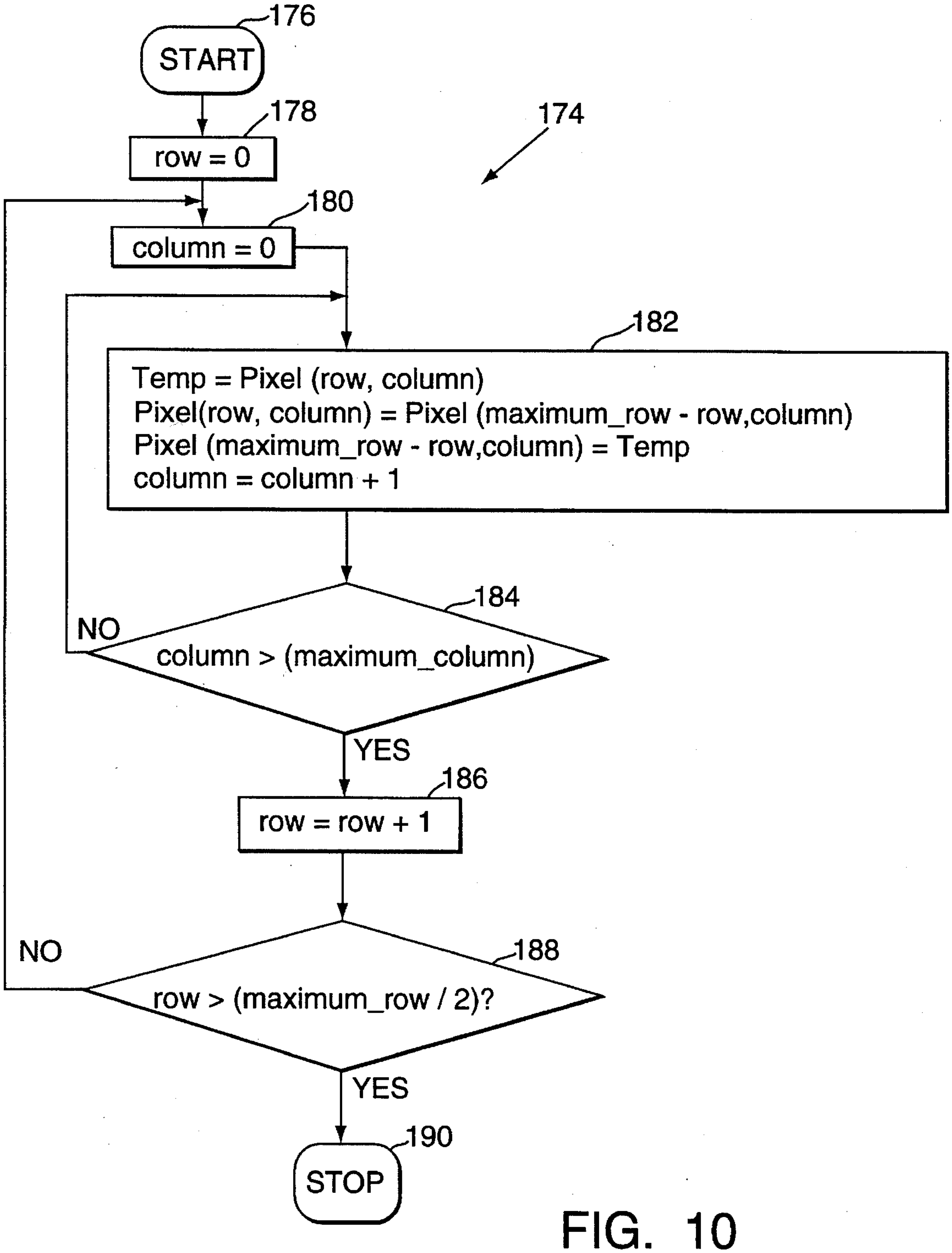
FIG. 10 is a detailed diagrammatic illustration of an algorithm executed by the system of FIG. 1 in performing the symmetric match as shown in FIG. 2.
Figure 11:
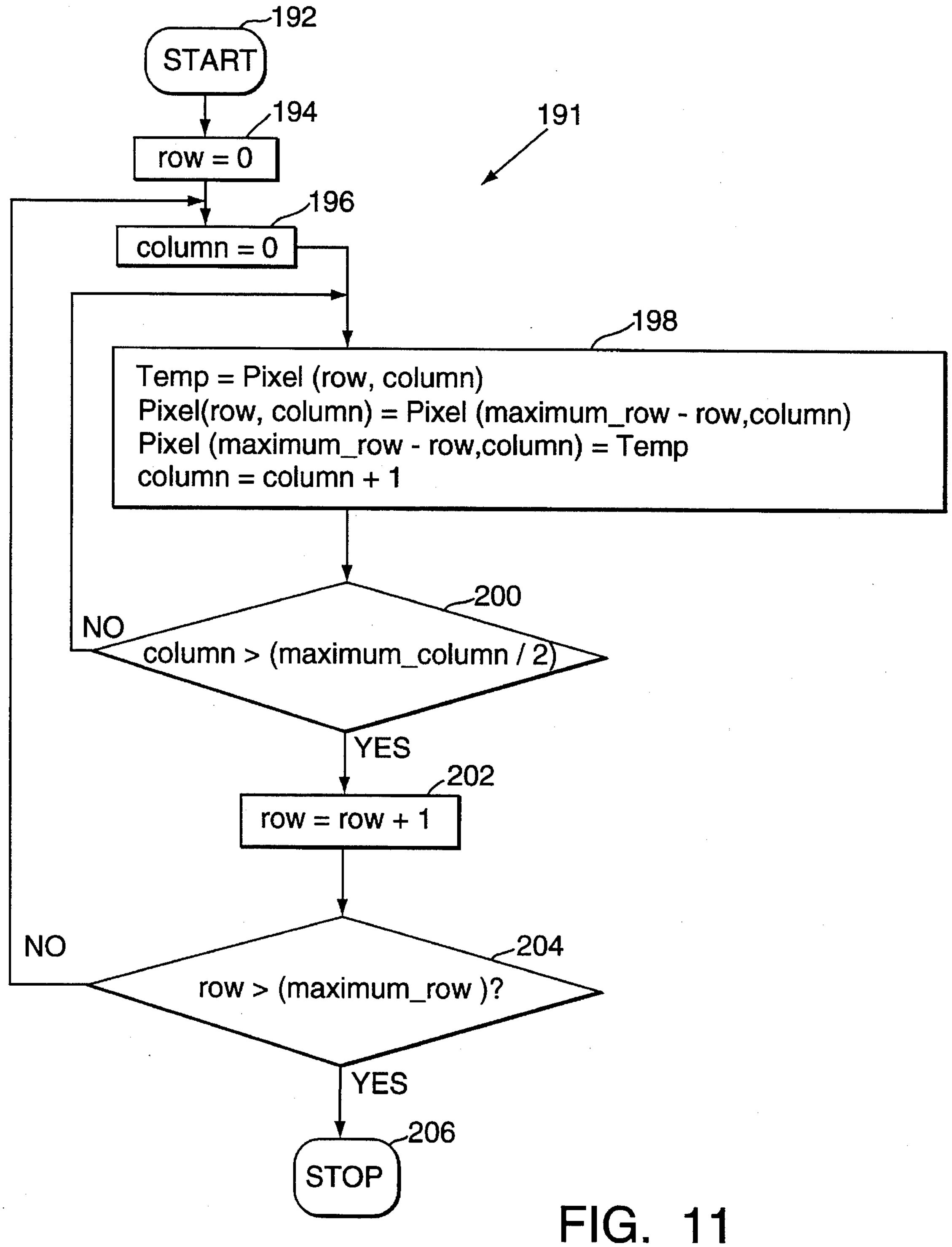
FIG. 11 is a detailed diagrammatic illustration of an algorithm executed by the system of FIG. 1 in performing the symmetric match as shown in FIG. 3.

FIGS. 10 and 11 provide a detailed diagrammatic illustration of the array substitution set forth with respect to FIGS. 7 and 8. Shown in FIG. 10 is a diagrammatical illustration of an algorithm 174 used to perform a X symmetric match. At block 176 the algorithm is initiated with row and columns set equal to 0 (blocks 178 and 180). Thereafter, the algorithm implements a interchange of row and column numbers for each pixel (block 182). For an X symmetrical interchange the image is flipped about the X axis. For all columns in an image, all pixels in the currant column are moved to the last column number minus the current column number. For an image with columns numbered 0 through 511:

column 0 is copied to column 511-0.

column 1 is copied to column 511-1.

column 510 is copied to column 511-510 column 511 is copied to column 511-511

If the column number exceeds the maximum column number divided by 2 (block 184) then the row is incremented (block 186). Should the row exceed a maximum number of rows divided by 2 (block 188) then the process is halted (block 190).

Similarly, with respect to FIG. 11, algorithm 190 is initiated at block 192 and the row and column numbers are initialized to 0 (blocks 194 and 196). Thereafter, the pixel addresses are adjusted (block 198). For a Y symmetrical interchange the image is flipped about the Y axis. For all rows in an image, all pixels in the current row are moved to the last row number minus the current row number. For an image with rows numbered 0 through 485:

row 0 is copied to row 485-0 row 1 is copied to row 485-1 row 484 is copied to 485-484 row 485- is copied to row 485-485

Should a column number exceed a maximum column number divided by 2 (block 200), then the current row numbers are replaced by the next row number (block 202) should the row number exceed the maximum row number divided by 2 (block 204) then the process is again halted at block 206.

Figure 12:
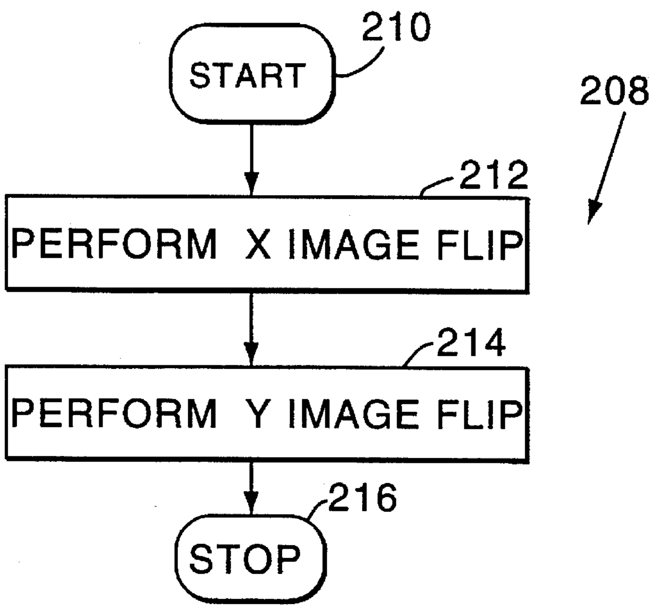
FIG. 12 is a detailed diagrammatic illustration of an algorithm executed by the system of FIG. 1 in performing the symmetric match as shown in FIG. 4.

For those fabric designs wherein 2 axes of symmetry are to be used to create a symmetric match, the process is as set forth in FIG. 12. At block 208, the algorithm is initiated. An X image flip is as detailed above is first performed (block 210). Thereafter a Y image flip is executed at block (212) before halting the algorithm (block 214). This process results in a mirror image created about an axis 45 degrees to the 2 axes of symmetry employed in the fabric pattern. For an image with columns numbed 0 through 511:

column 0 is copied to column 511-0.

column 1 is copied to column 511-1.

column 510 is copied to column 511-510 column 511 is copied to column 511-511

Subsequently for an image with rows numbered 0 through 485:

row 0 is copied to row 485-0.

row 1 is copies to row 485-1.

row 484 is copied to row 485-484 row 485- is copied to row 485-485

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A method for aligning a dependent garment segment in a marker with a match location in a pattern in a fabric web on an upper surface of a table in a system having a moveable video sub-system including a camera having an array of pixel elements configured to receive light from a portion of the fabric web and provide electrical signal equivalents thereof; said method comprising the steps of:

receiving marker signals including signals indicative of a first garment segment having a reference location therein and a second garment segment having a match location therein;

receiving, from said camera video sub-system, signals corresponding to said fabric web pattern;

comparing said fabric web pattern signals with said marker signals;

generating signals indicative of initial fabric web pattern position as compared to said first garment segment reference location;

generating a reference image of camera video sub-system pixels about said first garment segment reference position;

determining an axis of symmetry substantially about said first garment segment reference location and parallel to said fabric web pattern;

dividing said reference image into a plurality of N pixel arrays parallel in orientation to said axis of symmetry;

creating a match image from said reference image pixel arrays by positioning, across said symmetry axis, a copy of each m pixel array at a corresponding N–(m+l) array position;

comparing camera video sub-system pixels corresponding to an image about said second garment segment match position with said match image signals;

generating signals to determine a match position of said match image relative to said second garment segment reference point image that removes any difference in pixel state therebetween; and generating signals to adjust said second garment segment position in said marker to remove a difference between the location of said second garment segment reference point in said marker and said match position.

2. The method of claim 1 further comprising the steps of:

determining an axis of symmetry substantially about said first garment segment reference location and parallel to a fabric web pattern extending in a direction parallel to the length of said web.

3. The method of claim 1 further comprising the steps of:

determining an axis of symmetry substantially about said first garment segment reference location and parallel to said fabric web pattern extending in a direction perpendicular to the length of said web.

4. The method of claim I further comprising the steps of:

determining a first axis of symmetry substantially about said first garment segment reference location and parallel to a fabric web pattern extending in a direction parallel to the length of said web;

determining a second axis of symmetry substantially about said first garment segment reference location and parallel to said fabric web pattern extending in a direction perpendicular to the length of said web;

dividing said reference image into a first plurality of N pixel arrays parallel in orientation to said first axis of symmetry;

creating a first match image from said reference image pixel arrays by positioning, across said first symmetry axis, a copy of each m pixel array at a corresponding N–(m+1 ) array position;

dividing said first match image into a second plurality of N pixel arrays parallel in orientation to said second axis of symmetry;

creating a second match image from said first match image pixel arrays by positioning, across said second symmetry axis, a copy of each m pixel array at a corresponding N–(m+l) array position;

comparing camera video sub-system pixels corresponding to an image about said second garment segment match position with said second match image signals;

generating signals to determine a match position of said second match image relative to said second garment segment reference point image that removes any difference in pixel state therebetween; and generating signals to adjust said second garment segment position in said marker to remove a difference between the location of said second garment segment reference point in said marker and said match position.

5. A system for aligning a dependent garment segment in a marker with a match location in a pattern in a fabric web, said system comprising a table having an upper surface for receiving said fabric web;

a moveable video sub-system including a camera having an array of pixel elements configured to receive light from a portion of the fabric web and provide electrical signal equivalents thereof;

a means for receiving marker signals including signals of a first garment segment having a reference location therein and a second garment segment having a match location therein;

a means for receiving, from said camera video sub-system, signals corresponding to said fabric web pattern;

a means for comparing said fabric web pattern signals with said marker signals;

a means for generating signals indicative of initial fabric web pattern position as compared to said first garment segment reference location;

a means for generating a reference image of camera video sub-system pixels about said first garment segment reference position;

a means for determining an axis of symmetry substantially about said first garment segment reference location and parallel to said fabric web pattern;

a means for dividing said reference image into a plurality of N pixel arrays parallel in orientation to said axis of symmetry;

a means for creating a match image from said reference image pixel arrays by positioning, across said symmetry axis, a copy of each m pixel array at a corresponding N–(m+l) array position;

a means for comparing camera video sub-system pixels corresponding to an image about said second garment segment match position with said match image signals;

a means for generating signals to adjust said second garment segment position in said marker to determine a match position of said match image relative to said second garment segment reference point image that removes any difference in pixel state therebetween; and a means for generating signals to adjust said marker to remove a difference between the location of said second garment segment reference point in said marker and said match position.

6. The system of claim 5 further comprising:

a means for determining a first axis of symmetry substantially about said first garment segment reference location and parallel to a fabric web pattern extending in a direction parallel to the length of said web.;

a means for determining a second axis of symmetry substantially about said first garment segment reference location and parallel to a fabric web pattern extending in a direction perpendicular to the length of said web;

a means for dividing said reference image into a first plurality of N pixel arrays parallel in orientation to said first axis of symmetry;

a means for creating a first match image from said reference image pixel arrays by positioning, across said first symmetry axis, a copy of each m pixel array at a corresponding N–(m+l) array position;

a means for dividing said first match image into a second plurality of N pixel arrays parallel in orientation to said second axis of symmetry;

a means for creating a second match image from said first match image pixel arrays by positioning, across said second symmetry axis, a copy of each m pixel array at a corresponding N–(m+l) array position;

a means for comparing camera video sub-system pixels corresponding to an image about said second garment segment match position with said second match image signals;

a means for generating signals to determine a match position of said second match image relative to said second garment segment reference point image that removes any difference in pixel state therebetween; and a means for generating signals to adjust said second garment segment position in said marker to remove a difference between the location of said second garment segment reference point in said marker and said match position.

7. A fabric article made in accordance with a method for aligning a dependent garment segment in a marker with a match location in a pattern in a fabric web on an upper surface of a table in a system having a moveable video sub-system including a camera having an array of pixel elements configured to receive light from a portion of the fabric web and provide electrical signal equivalents thereof; said method comprising the steps of:

receiving marker signals including signals indicative of a first garment segment having a reference location therein and a second garment segment having a match location therein;

receiving, from said camera video sub-system, signals corresponding to said fabric web pattern;

comparing said fabric web pattern signals with said marker signals;

generating signals indicative of initial fabric web pattern position as compared to said first garment segment reference location;

generating a reference image of camera video sub-system pixels about said first garment segment reference position;

determining an axis of symmetry substantially about said first garment segment reference location and parallel to said fabric web pattern;

dividing said reference image into a plurality of N pixel arrays parallel in orientation to said axis of symmetry;

creating a match image from said reference image pixel arrays by positioning, across said symmetry axis, a copy of each m pixel array at a corresponding N–(m+1) array position;

comparing camera video sub-system pixels corresponding to an image about said second garment segment match position with said match image signals;

generating signals to determine a match position of said match image relative to said second garment segment reference point image that removes any difference in pixel state therebetween; and generating signals to adjust said second garment segment position in said marker to remove a difference between the location of said second garment segment reference point in said marker and said match position.

8. The method of claim 1 wherein said step of generating signals to determine a match position of said match image further comprises the steps of:

performing a low resolution match by:

creating initial first and second subdatabases of pixel signal values configured from first and second fabric image databases approximately centered on said reference and-match points;

dividing said initial databases into subarrays with each subarray configured relative to the other subarrays to maintain corresponding positions in the respective images; and summing, for each of said subarrays in each of said images, said pixel signal magnitudes to generate a matrix of resultant pixel magnitude signals for each of said images; and creating a final reduced database by replacing the elements of said subarrays with a corresponding element of said corresponding matrix;

determining a first aggregate matrix pixel value error from a sum of pixel value errors found by a comparison between corresponding first and second matrix values;

creating a third matrix of said second fabric sheet image final reduced database indexed a select amount from said fabric sheet image array center;

determining a second aggregate matrix pixel value error from a sum of pixel value errors found by a comparison between corresponding first and third reduced database values;

identifying as a low resolution match that subarray whose comparison yielded the lessor of said first and second aggregate matrix pixel value errors;

performing a high resolution match with said low resolution match subarray elements by:

creating a first subarray of pixel signal values configured from said first fabric sheet image array approximately centered on said reference point;

creating a second subarray of pixel signal values from said second fabric sheet image array approximately centered on said second low resolution match subarray;

determining a first aggregate pixel value error from a sum of pixel value errors found by a comparison between corresponding first and second array values;

creating a third subarray of said second fabric sheet image array pixel signal values indexed a select amount from said fabric sheet image array center;

determining a second aggregate pixel value error from a sum of pixel value errors found by a comparison between corresponding first and third array values;

identifying as a match that pixel value subarray whose comparison with said first pixel value array yielded the lessor of said first and second aggregate pixel value errors; and adjusting said second pattern location in said marker to remove any difference between the location of said second fabric sheet design and said second pattern match point in dependence on said low resolution and high resolution match.

* * * * *